United States Patent [19]

Madocks et al.

[11] Patent Number: 4,753,417
[45] Date of Patent: Jun. 28, 1988

[54] GATE VALVE FOR VACUUM PROCESSING APPARATUS

[75] Inventors: John E. Madocks, Piedmont; Alex Boozenny, Walnut Creek, both of Calif.

[73] Assignee: The BOC Group, Inc., Montvale, N.J.

[21] Appl. No.: 695,585

[22] Filed: Jan. 28, 1985

[51] Int. Cl.[4] .............................................. F16K 25/00
[52] U.S. Cl. ........................................ 251/158; 251/56; 251/298; 251/193
[58] Field of Search ................. 251/188, 193, 203, 56, 251/298, 158; 118/724, 719, 720, 725, 728, 729, 733

[56] References Cited

U.S. PATENT DOCUMENTS

| 653,600 | 7/1900 | Wiley | 251/158 |
|---|---|---|---|
| 1,325,303 | 12/1919 | McGill | 251/158 |
| 1,592,986 | 7/1926 | Martin | 251/158 |
| 3,258,243 | 6/1966 | Bryant | 251/193 |
| 3,641,973 | 2/1972 | Shrader | 118/719 |
| 3,656,454 | 4/1972 | Schrader | 118/724 |
| 3,720,229 | 3/1973 | Masson et al. | 137/527.8 |
| 4,065,097 | 12/1977 | Timin | 251/228 |
| 4,291,891 | 9/1981 | Faria | 251/158 |
| 4,470,579 | 9/1984 | Schertler | 251/158 |

FOREIGN PATENT DOCUMENTS

| 1642939 | 4/1972 | Fed. Rep. of Germany . | |
|---|---|---|---|
| 3338580 | 5/1985 | Fed. Rep. of Germany . | |
| 70025 | 2/1959 | France | 251/298 |
| 1199122 | 12/1960 | France | 251/298 |
| 471714 | 9/1937 | United Kingdom . | |
| 879857 | 9/1958 | United Kingdom . | |
| 932194 | 5/1961 | United Kingdom . | |
| 1375086 | 11/1974 | United Kingdom . | |
| 465515 | 6/1975 | U.S.S.R. | 251/158 |

Primary Examiner—James C. Yeung
Attorney, Agent, or Firm—David A. Draegert; Larry R. Cassett

[57] ABSTRACT

A gate valve for sealing an opening in the wall of a vacuum processing chamber is disclosed. The valve includes a gate having a pair of wheels mounted on opposite ends of the gate and a curved track aligned and shaped to guide the wheels through an angle so that the plane of the gate is rotated out of the path of substrates as the gate moves between its sealing and open positions. The curvature of the track should be sufficient to rotate the gate through an angle of at least 60°, and preferably 75° to 105°, in order to minimize the dimension of the chamber normal to the direction of substrate travel.

19 Claims, 2 Drawing Sheets

GATE VALVE FOR VACUUM PROCESSING APPARATUS

BACKGROUND OF THE INVENTION

The invention is in the field of valves for sealing an opening between chambers, particularly chambers in a vacuum coating apparatus.

High speed vacuum coating apparatus frequently comprises a series of in-line chambers which can be separately evacuated. Such apparatus may comprise entrance lock and holding or process chambers connected by gate valves which open to allow substrates to pass from one chamber to the next. Processing of large substrates requires use of large chambers and large gate valves. Minimization of the size of such chambers is important to minimize their cost and their evacuation time, which is frequently a major factor in determining the overall processing time.

Several types of gate valves are known. Sometimes the gate is directly connected to an actuator which moves the gate along a line perpendicular to the direction of motion of the substrates as in U.S. Pat. No. 3,656,454 to Shrader. U.S. Pat. No. 3,641,973 to Shrader shows a gate valve in which the gate has four wheels which roll along a horizontal track. In other cases, a pivoted gate is connected to an actuator by suitable connecting links. U.S. Pat. No. 4,065,097 to Timin discloses a slit valve having a gate which rotates approximately 90° about a pivot and having a pair of links connecting the center of each lateral edge of the gate to a cross bar attached to the end of the piston rod of a pneumatic cylinder. The cross bar is fitted with two pairs of wheels which move along a linear path confined by a track having a channel just wider than the diameter of the wheels. The movement of the actuator rod is along a line perpendicular to the direction of substrate motion through the valve opening. Such design requires either a valve having a dimension sufficient to accommodate the travel of the actuator or else an opening in the valve body to allow the actuator to protrude from the chamber with the attendant possibility of leakage around the seal of the opening.

SUMMARY OF THE INVENTION

The present invention is a gate valve for sealing an opening in the wall of a vacuum processing chamber. The valve includes a gate having a pair of wheels mounted on opposite ends of the gate and a curved track aligned and shaped to guide the wheels through an angle so that the plane of the gate is rotated out of the path of substrates as the gate moves between its sealing and open positions.

The use of a pair of wheels and track to rotate the gate enables a linear actuator to be oriented so that its movement is approximately parallel to the motion of substrates through the valve opening. The curvature of the track should be sufficient to rotate the gate through an angle of at least 60°. This angle is preferably in the range 75° to 105° in order to minimize the dimension of the chamber normal to the direction of substrate travel. An angle of approximately 90° is especially preferred. Provision of a second curve in the track enables the gate to approach and depart the opening in a direction substantially perpendicular to the plane of the opening so as to minimize scuffing of an O-ring seal which surrounds the perimeter of the opening.

DESCRIPTION OF THE PREFERRED EMBODIMENT

Figure 1:
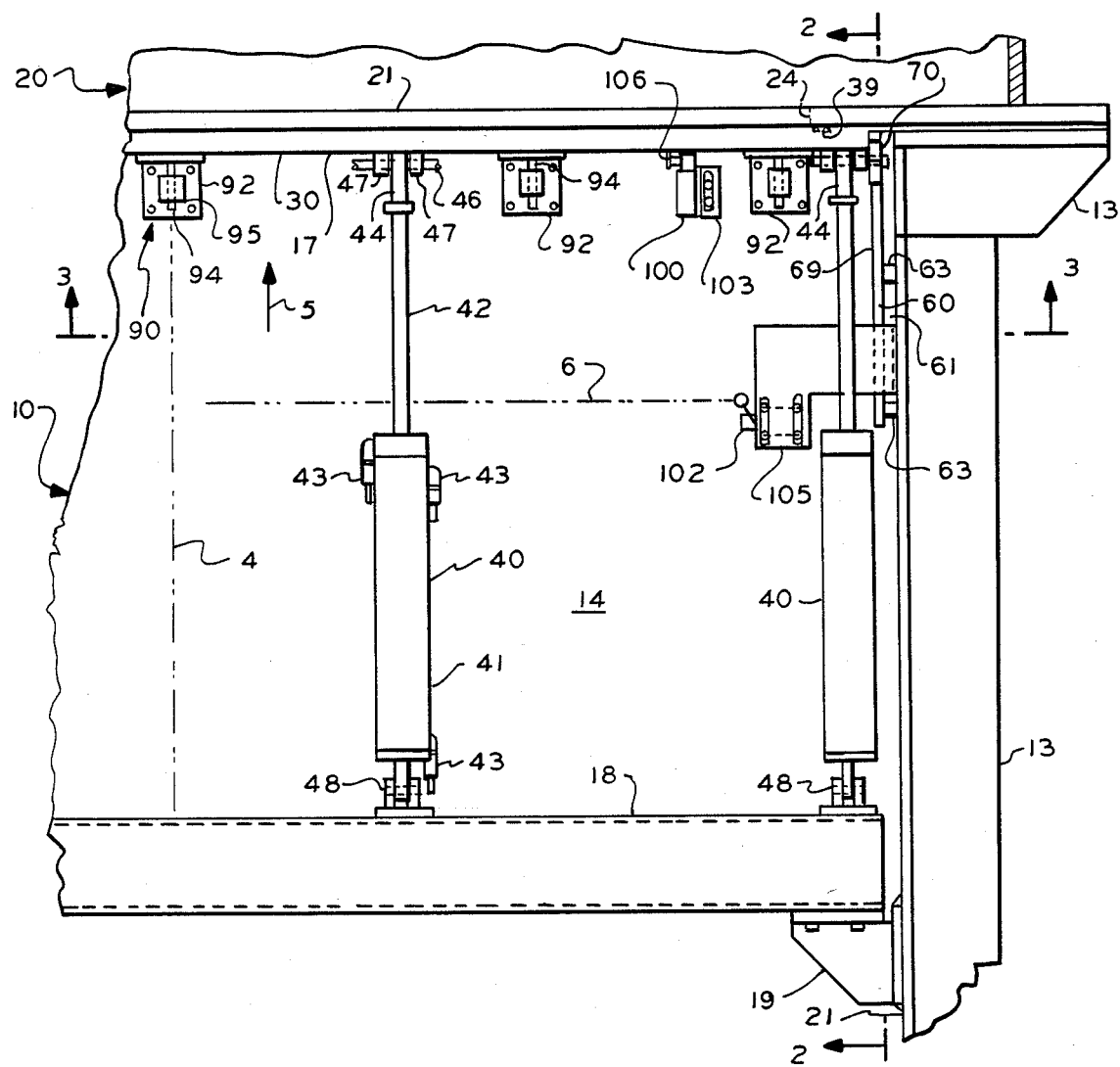
FIG. 1 is a top view of a portion of an evacuable chamber containing a gate valve according to the invention.

FIG. 1 shows the environment of the gate valve according to the invention. A vacuum processing apparatus comprises a first enclosed chamber 10 having a side wall 12, a bottom wall 14 and a top cover 16 which is not shown in the view of FIG 1. The components of the chambers and valve may be steel or other suitable material. In order to withstand the pressures produced by evacuation, the chamber walls may be stiffened with ribs 13. First chamber 10 has a flange 17 which is sealed to an end wall 21 of a second evacuable chamber 20. Wall 21 has a opening 22 (FIG. 2) which allows substrates to pass between chamber 10 and chamber 20 along the direction of arrow 5. The shape and dimensions of the opening depend upon the substrates. As shown in FIG. 3, opening 22 is rectangular with two lateral edges 24 (only one is shown) and two elongated edges 25. Substrates may be transported within and between chambers 10 and 20 by any convenient conveyor, such as a number of wheels or rollers 7, 8, two of which are shown in dashed outline in FIG. 2. Chambers 10 and 20 and opening 22 are symmetrical about the plane normal to FIG. 1 through center line 4.

The valve according to the invention comprises a gate 30, one or more actuators 40, a first pair of wheels 50 and a dual-rail track 60. Preferably, the valve also comprises a second pair of wheels 70 and a pair of lateral guide rollers 80. The valve is symmetrical about the vertical plane through center line 4 in FIG. 1 and only one of wheels 50 and 70, one roller 80, and one rail of track 60 is shown. In order to facilitate the transfer of workpieces between chambers 10 and 20, the valve is constructed so that the distance between the conveyors 7 and 8 is minimized.

Figure 2:
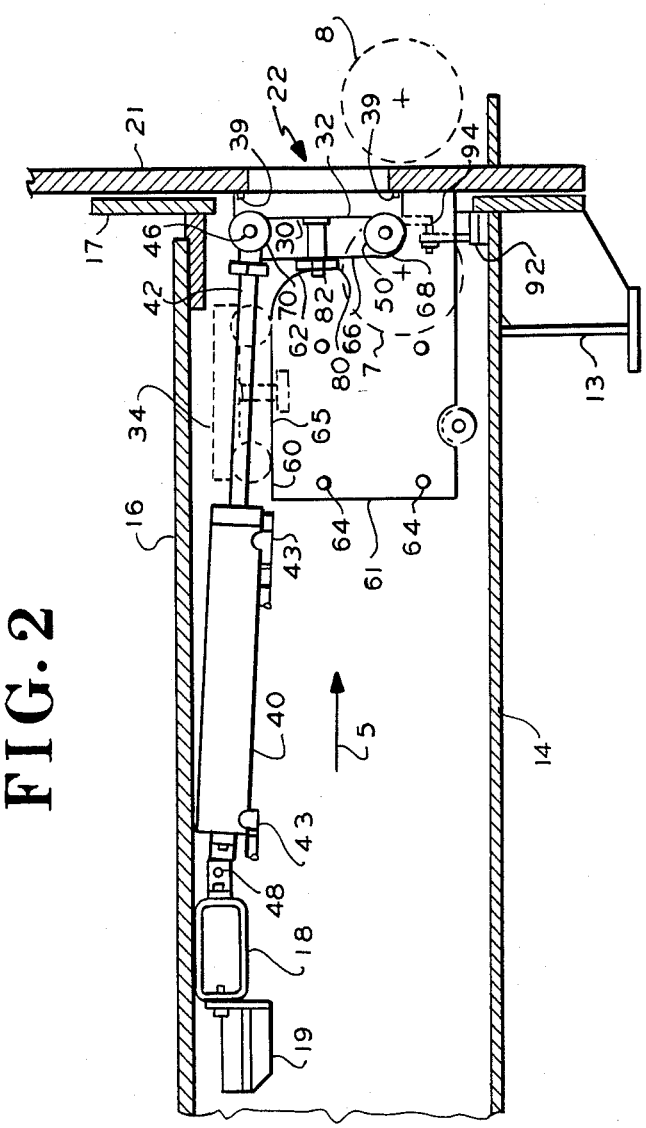
FIG. 2 is a side view, partially in cross-section, of the chambers and valve of FIG. 1. The cross-section is along the line 2—2 of FIG. 1 and the view is in the direction of the adjacent arrows.
Figure 3:
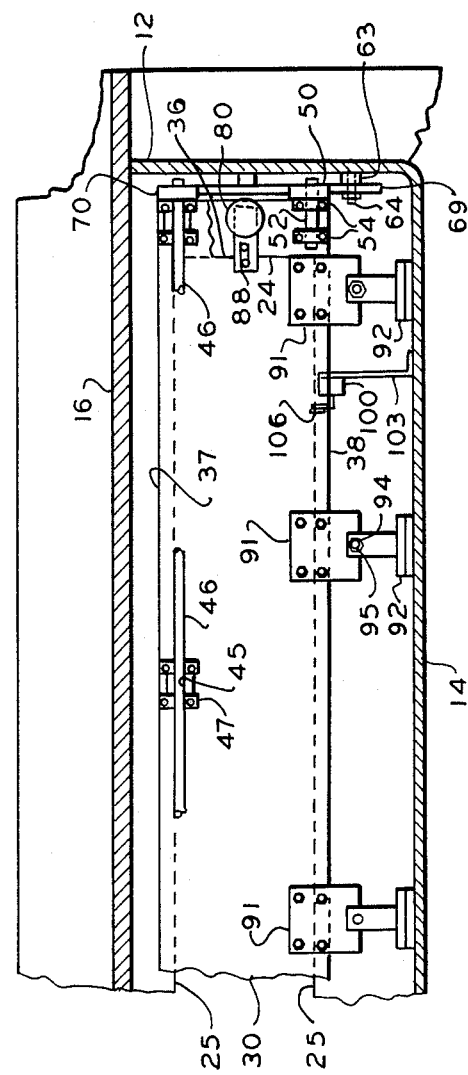
FIG. 3 is an end view, partially in cross-section, of the chambers and valve of FIG. 1. The cross-section is along the line 3—3 of FIG. 1 and the view is in the direction of the adjacent arrows.

In FIGS. 1 and 3, gate 30 is shown in its sealing position, designated 32 in FIG. 2. Upon contraction of linear actuators 40, wheels 50 move along track 60 through a curved section 62 so that the gate is rotated from its vertical sealing position 32 to a horizontal position 34, shown in broken lines in FIG. 2, where the opening 22 is substantially unobstructed.

Gate 30 is sized to cover opening 22. As shown, the gate is rectangular having two lateral edges, one of which is 36, and two elongated edges 37 and 38. Valves having large gates, such as 85 inches by 10 inches by 1.5 inches have been made according to the invention. An O-ring 39 is fitted in a groove in the gate in order to provide a seal around the perimeter of opening 22.

Each actuator 40 is a pneumatic cylinder having a body 41, a piston rod 42, and air supply and vent fittings 43 at each end of the body to control the position of the rod. The air lines to these fittings are not shown. One end of each actuator 40 is connected to the gate 30 by a fitting 44 having a bushing 45 which surrounds an axle 46 passing through four pairs of bearing blocks 47 mounted along the elongated edge 37 of gate 30, the upper edge in FIG. 3. Portions of axle 46 are omitted from FIGS. 1 and 3 for clarity. The other end of each actuator 40 is pivotally connected to a beam 18 fixed to the walls of chamber 10 by a bracket 19. The pivot pins 48 allow angular movement of the actuators as the gate moves.

Each wheel 50 is mounted for rotation on a stub shaft 52 which protrudes beyond each lateral edge of gate 30. The shafts 52 are co-axial and each is clamped in a pair of blocks 54 located near the elongated edge 38 of gate 30.

Preferably, the gate has a second pair of supporting wheels 70 mounted on the protruding ends of axle 46 which extends along elongated edge 37 of gate 30. Thus, the gate has four wheels mounted on axles parallel to its elongated edges. Wheels 70 may be fixed to the axle 46 so that they turn together and thus tend to minimize skewing of the gate in the event actuators 40 exert different forces on axle 46.

Track 60 comprises a pair of identical parallel plates 61 (only one is shown) mounted so they do not block substrates passing through the opening. In the preferred embodiment, they are mounted adjacent each side wall 12 with a number of spacers 63 and bolts 64. Corresponding edges of each plate have at least a first curved portion 62 and preferably a second curved portion 68. The plates are shaped and aligned to guide the wheeled gate as it moves between its open and sealing positions.

If the gate is initially in its open position 34, the gate is approximately horizontal in FIG. 2 and is supported by its four wheels 50, 70. One of each of the first and second pairs of wheels is resting on a flat, horizontal edge 65 of each plate 61. As the actuator extends, the first wheels roll along the flat section 65 and then downward along the first curve 62 through an angle of about 90° to a vertical section 66 of track. At the same time, the second pair of wheels roll along the same horizontal section 65 but then leave the track from curve 62 as the gate rotates through an angle of about 90° into a substantially vertical orientation.

Sealing of the gate is assusted by an engaging means 90 aligned along the elongated edge 38 of the gate. A series of pressure plates 91 are aligned with a corresponding number of pressure members comprising adjustment screws 94 and blocks 92 mounted on the bottom wall 14 of chamber 10. One side of each pressure plate 91 contacts the end of a screw 94 as wheels 50 approach the bottom of the vertical section 66 of the track. Lock nuts 95 allow the screws to be fixed in position so that the gate is levered against the screws as the actuator completes its extension. Thus, complete extension of the actuator drives both upper and lower elongated edges of the gate 30 against the chamber wall 21 and compresses the O-ring 39 to seal the opening. The gate is wedged between screws 94 and wall 21 to ensure a tight seal. The final motion of the gate is substantially normal to the wall in order to minimize scuffing of the O-ring. Replacement of the O-ring is easily accomplished when the gate is in its open position and the top cover 16 is removed.

In the preferred embodiment, the vertical section 66 of tracks leads to a second curved section 68 where the track curves back toward the horizontal in FIG. 2 which produces a slight incline for wheels 50 so that the gate 30 initially moves slightly down and away from its sealing position when the actuator retracts to open the valve.

Preferably the valve also includes a pair of lateral guide rollers 80 (only one is shown). Each roller 80 is mounted on a short stub shaft 82 which extends perpendicular to the gate from a point near the center of each lateral edge 36. A laterally adjustable bracket 88 allows the gate to be aligned with each wheel 80 is in contact with the side 69 of a plate 61 which faces the interior of the chamber 10. These wheels guide the gate as it moves to prevent undesirable lateral motion.

In order to facilitate process control, the gate valve may be fitted with sensors which are activated when the gate is in its open and sealing positions. Such sensors may be conventional microswitches 100 and 102 mounted on adjustable brackets, 103 and 105, respectively. The state of microswitch 100 changes when its actuator 106 comes in contact with the elongated edge 38 of gate 30 as the gate approaches or departs its sealing position. Microswitch 102 is activated when the elongated edge 37 of the gate approaches or departs line 6 which designates its fully open position in FIG. 1.

The gate valve of the preferred embodiment may be modified in several ways without departing from the spirit of the invention. Different type of actuators may be used, for example.

In the preferred embodiment, the angle of the second curve is greater than 90°, but this angle may be 90° or less, if proper sealing of the gate is assured. When this angle is less than 90°, the track forces the first pair of wheels 50 and the gate into their sealing position as the actuator nears the end of its extension. The angle of the second curve is preferably in the range 60° to 110°.

In the preferred embodiment, the valve is oriented so the gate rotates between a vertical sealing position and a horizontal open position. It is believed that a slightly modified valve may be oriented differently, whereby, for example, the gate rotates between a horizontal sealing position and a vertical open position, or wherein the rotating gate is always in a vertical plane. In the latter two situations, it may be desirable that the track comprise sections of channel in order to keep the wheels in contact with the track and to provide smooth operation of the valve.

Still other modifications are possible without departing from the invention which is defined by the following claims.

What is claimed is:

1. A gate valve for sealing an opening in a wall of a vacuum processing chamber, comprising:
    a gate,
    a linear actuator for moving the gate which actuator moves approximately perpendicular to the plane of the gate in its sealing position,
    a first pair of wheels with parallel axles mounted on the gate,
    a track having a first curve of greater than about 60° and aligned for guiding the first wheels through a first angle greater than about 60° so that the plane of the gate is rotated through an angle of greater than about 60° to a position where the opening is substantially unobstructed as the gate moves from its sealing to its open position, and having a second curve for guiding the first wheels through a second angle of greater than about 60° as the gate approaches its sealing position, and
    a second pair of wheels with parallel axles mounted on the gate for guiding the gate along the track.

2. The gate valve according to claim 1 wherein the second angle is between approximately 90° and 110°.

3. The gate valve of claim 1 further comprising a pair of rollers mounted on parallel axles perpendicular to the gate to laterally guide the gate as the gate moves along the track.

4. The gate valve according to claim 3 wherein the gate is rotated through an angle between 70° and 105°.

5. The gate valve according to claim 4 wherein the gate is rotated between a substantially vertical sealing position and a substantially horizontal open position.

6. The gate according the claim 1 wherein the gate valve is elongated and the first pair of wheels are mounted at opposite ends adjacent a first elongated edge of the gate and the actuator is connected to the gate adjacent the opposite elongated edge of the gate.

7. The gate valve according to claim 6 further comprising a plurality of pressure members for engaging the gate near the first elongated edge to assist in holding the gate in its sealing position.

8. The gate valve according to claim 7 wherein the gate is wedged between the pressure members and the wall when the gate is in its sealing position.

9. The gate valve according to claim 8 wherein the second pair of wheels are mounted at opposite ends adjacent the opposed elongated edge of the gate.

10. The gate valve according to claim 9 further comprising a pair of rollers mounted on parallel axles perpendicular to the gate to laterally guide the gate as the gate moves along the track.

11. The gate valve according to claim 6 wherein at least one linear actuator is spaced intermediate the opposite ends of the gate.

12. The gate valve according to claim 11 further comprising a plurality of linear actuators spaced along the elongated edge opposite the first elongated edge of the gate.

13. The gate valve according to claim 12 further comprising a plurality of pressure members for engaging the gate near the first elongated edge to assist in holding the gate in its sealing position.

14. The gate valve according to claim 13 further comprising a pair of rollers mounted on parallel axles perpendicular to the gate to laterally guide the gate as the gate moves along the track.

15. The gate valve according to claim 14 wherein the second pair of wheels are mounted at opposite ends adjacent the opposed elongated edge of the gate.

16. The gate according to claim 15 wherein the gate is rotated through an angle between 75° and 105°.

17. The gate valve according to claim 16 wherein the gate is rotated between a substantially vertical sealing position and a substantially horizontal open position.

18. The gate valve according to claim 1 wherein the gate is rotated through an angle between 75° and 105°.

19. The gate valve according to claim 18 wherein the gate is rotated between a substantially vertical sealing position and a substantially horizontal open position.

* * * * *